(12) United States Patent
Ovadia et al.

(10) Patent No.: US 9,367,423 B1
(45) Date of Patent: Jun. 14, 2016

(54) METHODS, SYSTEMS, AND ARTICLES OF MANUFACTURE FOR USING MULTIPLE MODES DURING EXECUTION OF A PROGRAM

(75) Inventors: Meir Ovadia, Zur-Igal (IL); Rodion Milnikov, Modiin (IL)

(73) Assignee: Cadence Design Systems, Inc., San Jose, CA (US)

( * ) Notice: Subject to any disclaimer, the term of this patent is extended or adjusted under 35 U.S.C. 154(b) by 259 days.

(21) Appl. No.: 13/189,436

(22) Filed: Jul. 22, 2011

(51) Int. Cl.
*G06F 9/44* (2006.01)
*G06F 11/34* (2006.01)

(52) U.S. Cl.
CPC .................. *G06F 11/3466* (2013.01)

(58) Field of Classification Search
CPC .................................. G06F 11/3466
USPC ........................................ 717/131
See application file for complete search history.

(56) References Cited

U.S. PATENT DOCUMENTS

| | | | |
|---|---|---|---|
| 5,764,989 A | 6/1998 | Gustafsson et al. | |
| 6,009,256 A | 12/1999 | Tseng et al. | |
| 6,249,907 B1 * | 6/2001 | Carter et al. | 717/129 |
| 6,256,752 B1 | 7/2001 | Blandy et al. | |
| 6,353,923 B1 | 3/2002 | Bogie et al. | |
| 6,530,075 B1 * | 3/2003 | Beadle et al. | 717/114 |
| 6,594,783 B1 | 7/2003 | Dollin et al. | |
| 6,910,206 B1 | 6/2005 | Nevill | |
| 7,134,119 B2 | 11/2006 | Nevill | |
| 7,203,926 B2 | 4/2007 | Bogie et al. | |
| 7,296,257 B1 | 11/2007 | Dibble et al. | |
| 7,464,373 B1 | 12/2008 | Yunt et al. | |
| 7,617,084 B1 | 11/2009 | Koslow et al. | |
| 7,774,172 B1 | 8/2010 | Yunt et al. | |
| 7,984,304 B1 | 7/2011 | Waldspurger et al. | |
| 8,131,523 B1 | 3/2012 | Yunt et al. | |
| 8,196,107 B2 | 6/2012 | Stall et al. | |
| 8,271,958 B2 | 9/2012 | Stall et al. | |
| 8,572,578 B2 | 10/2013 | Stall | |
| 8,578,339 B2 | 11/2013 | Day et al. | |
| 8,607,199 B2 | 12/2013 | Kim et al. | |
| 8,776,024 B2 | 7/2014 | Cabillic et al. | |
| 8,826,244 B2 | 9/2014 | Kandasamy et al. | |
| 2001/0005852 A1 | 6/2001 | Bogie et al. | |

(Continued)

OTHER PUBLICATIONS

Non-Final Office Action dated May 7, 2014 for U.S. Appl. No. 12/784,857.

(Continued)

*Primary Examiner* — Li B Zhen
*Assistant Examiner* — Sen Chen
(74) *Attorney, Agent, or Firm* — Vista IP Law Group, LLP

(57) ABSTRACT

Disclosed are various embodiments relating to methods, systems, and articles of manufacture for using multiple modes during execution of a program. Various embodiments enable a use to switch among multiple modes of execution of a program during an execution of the program without recompiling a higher level code of the program or without restarting the execution of the program from the beginning. Some embodiments enable the user to switch among different modes regardless of whether or not the preparation for the execution of the program in modes other than the first mode is available. Some embodiments enable the user to switch among different modes of execution of a program while sharing the same environment or context of the execution of the program among these different modes of execution.

18 Claims, 15 Drawing Sheets

(56) References Cited

U.S. PATENT DOCUMENTS

| | | | |
|---|---|---|---|
| 2002/0019976 A1* | 2/2002 | Patel et al. | 717/137 |
| 2002/0029357 A1* | 3/2002 | Charnell et al. | 714/9 |
| 2002/0073375 A1 | 6/2002 | Hollander | |
| 2002/0104077 A1 | 8/2002 | Charnell et al. | |
| 2002/0108103 A1 | 8/2002 | Nevill | |
| 2002/0108107 A1 | 8/2002 | Darnell et al. | |
| 2004/0015863 A1 | 1/2004 | McBrearty et al. | |
| 2004/0210872 A1 | 10/2004 | Dorr et al. | |
| 2004/0221272 A1* | 11/2004 | Wu et al. | 717/128 |
| 2006/0020921 A1 | 1/2006 | Pasumansky et al. | |
| 2006/0064676 A1 | 3/2006 | Chavan | |
| 2006/0164269 A1 | 7/2006 | Trimbell et al. | |
| 2006/0253508 A1 | 11/2006 | Colton et al. | |
| 2007/0157174 A1 | 7/2007 | Gebhardt et al. | |
| 2007/0250819 A1 | 10/2007 | Fjeldstad et al. | |
| 2008/0066059 A1 | 3/2008 | Pugh et al. | |
| 2008/0263528 A1 | 10/2008 | Moore et al. | |
| 2008/0276226 A1 | 11/2008 | Farchi et al. | |
| 2009/0158257 A1 | 6/2009 | Xu et al. | |
| 2009/0172632 A1 | 7/2009 | Kashai et al. | |
| 2009/0254801 A1 | 10/2009 | Pressman et al. | |
| 2009/0319999 A1 | 12/2009 | Stall et al. | |
| 2010/0037213 A1 | 2/2010 | Meijer et al. | |
| 2010/0146377 A1* | 6/2010 | Simonyi | 715/229 |
| 2010/0162212 A1 | 6/2010 | Stall et al. | |
| 2010/0192134 A1 | 7/2010 | Arkhipov et al. | |
| 2010/0313189 A1 | 12/2010 | Beretta et al. | |
| 2011/0078651 A1 | 3/2011 | Ovadia et al. | |
| 2011/0265066 A1 | 10/2011 | Fee et al. | |
| 2011/0296377 A1 | 12/2011 | Morozov et al. | |
| 2011/0307872 A1 | 12/2011 | Stall | |
| 2012/0167052 A1 | 6/2012 | Fjeldstad et al. | |
| 2012/0304154 A1 | 11/2012 | Cabillic et al. | |
| 2012/0331449 A1 | 12/2012 | Farchi et al. | |
| 2014/0033183 A1 | 1/2014 | Brown | |
| 2014/0282417 A1 | 9/2014 | Paveza et al. | |

OTHER PUBLICATIONS

Cai et al., "Debugging a High Level Language via a Unified Interpreter and Compiler Runtime Environment", In proceedings of EACA'04, Universidad de Santander, Spain, Jul. 1-3, 2004, pp. 1-6; <http://www.csd.uwo.ca/-moreno//Publications/CDMW-EACA-04.ps>.

Jinlong Cai, "Debugging a High Level Language via a Unified Interpreter and Compiler Runtime Environment", Aug. 2004, The University of Western Ontario, London, Ontario, Canada, pp. 1-84; <http://www.csd.uwo.ca/-moreno/Publications/JinlongCai-MSThesis-2004.pdf.gz>.

Non-Final Office Action dated Jul. 24, 2012 for U.S. Appl. No. 12/784,857.

Final Office Action dated Nov. 2, 2012 for U.S. Appl. No. 12/784,857.

Non-Final Office Action dated Mar. 1, 2013 for U.S. Appl. No. 12/784,857.

Non-Final Office Action dated Sep. 26, 2013 for U.S. Appl. No. 12/784,857.

Victor Berman, "An update on IEEE P1647: TheE system verification language", 2005 IEEE, pp. 484-486; <http://ieeexplore.ieee.org/stamp/stamp.jsp?arnumber=01511984>.

Stephen A. Edwards, "Design and Verification Languages", Nov. 2004, Columbia Univerisyt, New York, New York, pp. 1-18; <http://www.cs.co lu mb ia.edu/tech reports/cucs-046-04. pdf>.

Hollander et al., "Thee Language: A Fresh Separation of Concerns", 2001 IEEE, pp. 41-50; <http://ieeexplore.ieee.org/stamp/stamp.jsp?tp=&arnumber=911754>.

Victor Berman, "IEEE P1647 E Language: Cadence Plans for Standardization and Integration in Incisive Verification Flow", Jun. 2005, Cadence Design Systems, pp. 1-2; <http://www.cadence.com/news-letters/incisiveplatform/ieee_p1647elanguage.pdf>.

XIreme-11 "VPA for Scalable Performance", 2004.

"Methods, Part 1," URL:http://www.asic-world.com/specman/methods1.html#Introduction_to_Methods, Aug. 1, 2013.

"Methods, Part 2," URL:http://www.asic-world.com/specman/methods2.html, Aug. 1, 2013.

"Specman In One Day, Part I," URL:http://www.asic-world.com/specman/specman_one_day1.html#Introduction, Mar. 20, 2011.

"Specman In One Day, Part II," URL:http://www.asic-world.com/specman/specman_one_day2.html, Aug. 1, 2013.

"Specman In One Day, Part III," URL:http://www.asic-world.com/specman/specman_one_day3.html, Aug. 1, 2013.

"Specman In One Day, Part IV," URL:http://www.asic-world.com/specman/specman_one_day4.html, Aug. 1, 2013.

"Tips for HVL and HDL users with special emphasis on Specman-e, SystemVerilog and Questa" URL:http://www.specman-verification.com/?entry=entry091112-093154, Nov. 12, 2009.

Niklaus Wirth, "Compiler Construction" Nov. 2005.

Notice of Allowance dated Nov. 24, 2014 for U.S. Appl. No. 12/784,857.

Seaton et al., "Debugging at Full Speed", 2014 ACM, Dyla'14 Jun. 2014, Edinburgh, UK, pp. 1-13; <http://dl.acm.org/results.cfm?h=1&cfid=454254856&cftoken=51700954>.

Hiser et al., Techniques and Tools for Dynamic Optimization, Apr. 2006 IEEE, IPDPS 2006, pp. 1-8; <http://ieeexplore.ieee.org/stamp/stamp.jsp?tp=&arnu mber= 1 639569 >.

Cai et al., "Debugging a High Level Language via a Unified Interpreter and Compiler Runtime Environment", ISSAC 2004, Jul. 2004, University of Cantabria, Santander, Spain, pp. 1-6; <www.sigsam.org/issac/2004/poster-abstracts/abstract06.pd>.

* cited by examiner

252 Exemplary User Method in Verification Language
```
a_method() is {
            me.ticks += 1;
            me.info.update();
}
```

254 Exemplary User Method in Lower Level Language
```
void translated_a_method_opt() {
            me->ticks += 1;
            translated_update(me->info);
}{fully optimized}
```

256 Exemplary User Method in Lower Level Language
```
void translated_a_method_dbg() {
If (debug) check_bpoint_enter(ID);
            me->ticks += 1;
            translated_update(me->info);
If (debug) check_bpoint_exit(ID);
} {runtime debugger notification mode}
```

258 Exemplary User Method in Lower Level Language
```
void translated_a_method_notify() {
            me->ticks += 1;
            If (notify_value) notify_increment (me->ticks, 1);
            translated_update(me->info);
} {value debugger notification mode}
```

260 Exemplary User Method in Lower Level Language
```
void translated_a_method_check() {
            me->ticks += 1;
            check_not_null(me->info);
            translated_update(me->info);
}{runtime checks mode}
```

FIG. 2B

452 Exemplary Method Call in Object-Oriented Language

...
ObjectA.method_2 ();
...

454 Exemplary Method Call in Assembly Language

```
...
move    r1, r0              ;move "this' pointer into r1
move    r2, ptr [r1]        ;get this address of the type record in Dispatch Table
call    ptr    [r2+0x12]    ;dispatch the routine pointer at offset 0x12 from type record
...
```

| 456 Dispatch Table | | | | |
|---|---|---|---|---|
| . . . . . . | | | | |
| Type A0 | rp1 | | | ... |
| 458 A | rp1 | rp2 | rp3 | ... |
| 460 B | rp1 | | rp3 | ... |
| . . . . . . | | | | |

462 Compiled Routine move r1, ptr[sp+0x16]
...
ret

464 Compiled Routine

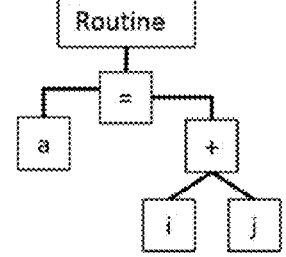

| 466 Dispatch Table | | | | |
|---|---|---|---|---|
| . . . . . . | | | | |
| Type A0 | rp1 | | | ... |
| Type A | rp1 | rp2' | rp3 | ... |
| Type B | rp1 | | rp3 | ... |
| . . . . . . | | | | |

468 Interpreted Routine move r1, ptr[sp+0x16]
...
ret

470 Interpreted Routine

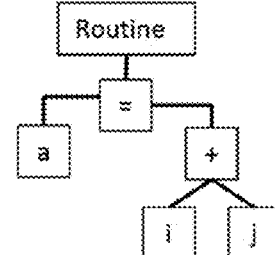

FIG. 4B

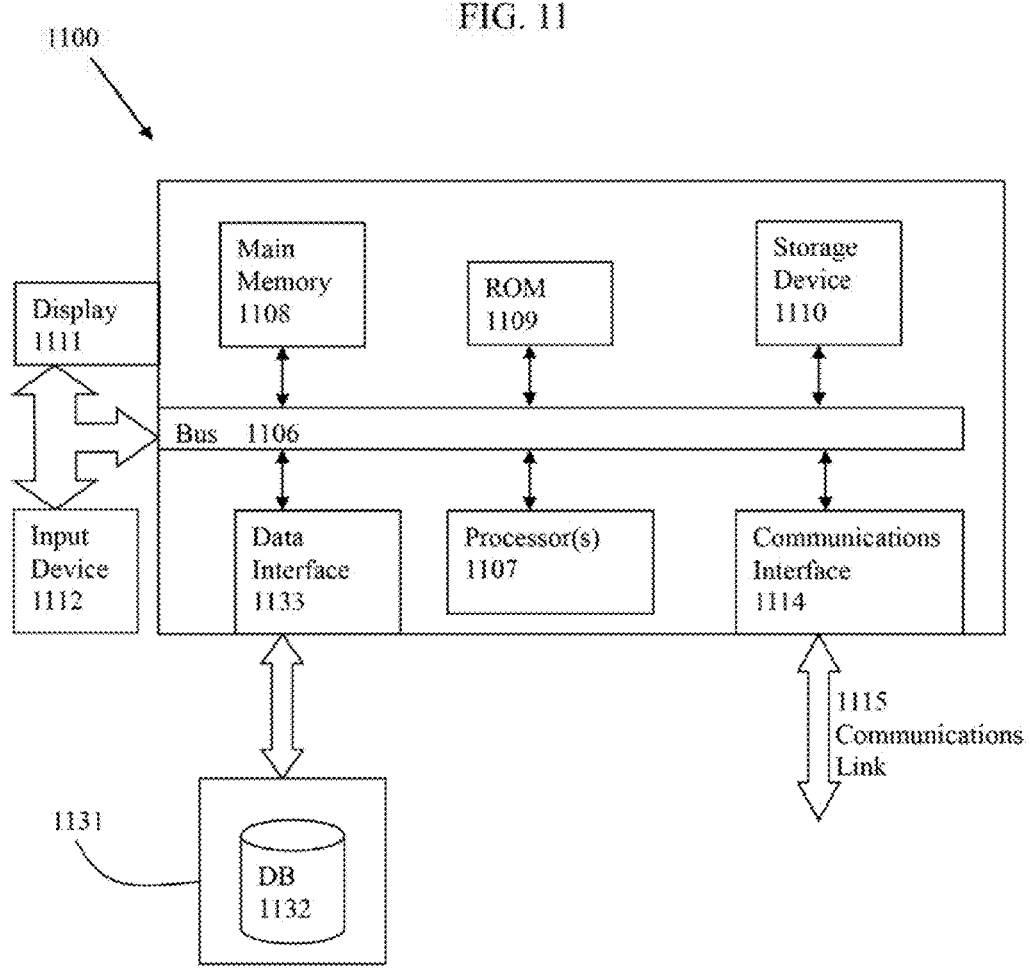

METHODS, SYSTEMS, AND ARTICLES OF MANUFACTURE FOR USING MULTIPLE MODES DURING EXECUTION OF A PROGRAM

REFERENCE TO CROSS-RELATED APPLICATION(S)

The instant Application is cross-related to U.S. application Ser. No. 12/784,857 filed on May 21, 2010 and entitled "METHOD AND SYSTEM FOR DEBUGGING OF COMPILED CODE USING AN INTERPRETER". The contents of the aforementioned application are hereby incorporated by reference in their entireties.

COPYRIGHT NOTICE

A portion of the disclosure of this patent document includes material, which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

BACKGROUND

Like any other development process for a complex design, it is important to ensure that the process for developing software involves adequate testing and verification of the performance and functionality of the software. For software in particular, it is quite common during the development process to discover errors or "bugs" in the programming code. Many different types of errors may occur in a software program. For example, such errors can be syntax errors, semantic errors, or logic errors. Because the semantic and logic errors can occur even if the coding obeys the language (syntax) rules, semantic and logic errors cannot typically be identified by the compiler or interpreter. Therefore, a software developer will often need to engage in debugging activities in one or more debugging modes to address errors that are semantic or logic in nature. In some cases, a developer or a programmer may wish to perform tracing or event logging at various points in time to acquire information about the execution or run (hereinafter run) of a software program. Furthermore, a developer or a programmer may wish to perform runtime checking to check for errors, such as arithmetic overflow or invalid type casts, at runtime. On the other hand, a verification environment may have different modes such as the compiled and optimized mode, the debug compiled and optimized mode, the debug compiled and non-optimized mode, the interpreted mode, etc. In other words, a developer or a programmer may wish to switch among different modes for various purposes.

Therefore, what are needed are a method, a system, and an article of manufacture for using multiple modes during execution of a program.

SUMMARY

Disclosed are various embodiments relating to methods, systems, and articles of manufacture for using multiple modes during execution of a program.

In some embodiments, the method or the system allows a developer or a programmer to switch among multiple modes of execution of a program during an execution of the program without recompiling a higher level code of the program without restarting the execution of the program from the beginning. In some embodiments, the method or the system further allows the user to switch among different modes of execution of a program during the execution of the program in a first mode regardless of whether or not the needed or desired preparation for the execution of the program in modes other than the first mode is available. In some embodiments, one or more modes of execution may be created or prepared on demand or on the fly without recompiling the program such that the method or the system may switch to any desired or required modes without user intervention. In addition, certain modes of execution of the program execute more efficiently than other modes. For example, a debug mode executes more slowly than an optimized and compiled mode. In some embodiments, one or more modes of execution may be created or prepared on demand or on the fly such that the user or the system may decide whether, when, or where the user or the system is willing to have a lower execution efficiency of a particular mode in exchange for other gains, purposes, or advantages of this particular mode This is in sharp contrast with approaches that code one or more modes with lower execution efficiency before compilation so the execution of the program suffers from the lower efficiency modes regardless of whether or not the user or the system desires, requires, or is willing to have a lower execution efficiency. In some embodiments, the method or the system allows the user to switch among different modes of execution of a program during the execution of the program in a first mode while sharing the same environment or context of the execution of the program among these different modes of execution in a way that the switches among different modes are transparent for the logic of the user code while keeping unchanged all the user-visible information, data structures, execution order, etc.

In one or more embodiments, a method for using multiple modes during execution of a program includes the process for initiating, continuing, or resuming execution of the program in a first mode using a first code of a first part of the program, and for identifying a trigger to continue the execution of the program in a second mode. The method may further include the process for switching to the second mode to continue the execution of the program in the second mode using a second code of a second portion of the program and the process for continuing the execution of the program in the second mode in some embodiments. In some embodiments, the method may further comprise the process for determining whether there exists an additional trigger to continue the execution in a specified mode, and the process for determining whether preparation for the second mode exists, wherein the preparation for the second mode comprises the second code.

In some embodiments, the method may further comprise the process for stopping the execution of the program in the first mode, wherein the preparation for the second mode is determined not to exist, the process for generating the preparation for the execution of the program in the second mode, the process for reloading the first code of the first portion of the program, and the process for continuing the execution of the program in the first mode using the first code without restarting the execution of the program. In some embodiments, the method may further comprise at least one of the process for modifying an entry in a dispatch table for the second portion of the program in the execution of the program in the first mode, and the process for modifying an address of the second portion at or before the entry point of the second portion of the program in the execution of the program in the first mode.

In some embodiments, the process for generating the preparation for the execution of the program in the second mode may comprise defining means of acquiring knowledge about the execution of the program in the second mode, the process for performing lexical analysis on a representation of the program, the process for performing a syntactic analysis on the representation of the program or a modified representation of the program based at least in part upon a result of the act of performing the lexical analysis, the process for performing a semantic analysis based at least on a result of the act of performing the syntactic analysis, and the process for generating the second code based at least in part upon a result of the action of performing the semantic analysis. In some embodiments, the process for performing the lexical analysis on the representation of the program may comprise the process for identifying a source string of the representation of the program, and the process for splitting the source string of the representation of the program into a plurality symbols without generating a meaningless symbol.

In some embodiments, the process for performing the syntactic analysis on the representation of the program or the modified representation of the program may comprise the process for determining one or more components that make up one or more expressions, the process for determining an order of the one or more components for the one or more expressions, and the process for determining one or more data structures based at least in part upon the order. In some embodiments, the process for performing a semantic analysis may comprise the process for determining one or more implications of the one or more expressions, the process for identifying or determining one or more actions based at least in part upon the one or more implications, the process for performing at, least one of the one or more actions, and the process for generating the second code of the second portion of the program.

Some embodiments are directed at a hardware computing system that is programmed, configured, or implemented to perform some or all of the processes or actions. Some other embodiments are directed at an article of manufacture including a non-transitory computer accessible storage medium that has stored thereupon a sequence of instructions whose execution by at least one processor or processor core (hereinafter processor) causes the at least one processor to perform some or all of the processes or actions.

Further details of various embodiments of the invention are described in the Detailed Description section with reference to respective figures.

BRIEF DESCRIPTION OF THE FIGURES

The drawings illustrate the design and utility of various embodiments. It should be noted that the figures are not drawn to scale and that elements of similar structures or functions are represented by like reference numerals throughout the figures. In order to better appreciate how to obtain the above-recited and other advantages and objects of various embodiments, a more detailed description of the inventions briefly described above will be rendered by reference to specific embodiments thereof, which are illustrated in the accompanying drawings. Understanding that these drawings depict only certain embodiments and are not therefore to be considered limiting of its scope, certain embodiments will be described and explained with additional specificity and detail through the use of the accompanying drawings in which:

FIG. 2B illustrates some exemplary pseudo code for the corresponding modes of execution of a program in some embodiments.

FIG. 4B illustrates an exemplary switching between two exemplary modes of execution of a program in some embodiments.

FIG. 11 illustrates a block diagram of an illustrative computing system 1100 suitable for implementing various embodiment of the invention

DETAILED DESCRIPTION OF ILLUSTRATED EMBODIMENTS

Various embodiments are directed to methods, systems, and computer program products for fulfilling a request for loan of a business entity. Other objects, features, and advantages of embodiments of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of embodiments. Where certain elements of embodiments can be partially or fully implemented using known components (or methods or processes), portions of such known components (or methods or processes) that are necessary for an understanding of the invention will be described, and the detailed descriptions of other portions of such known components (or methods or processes) will be omitted for ease of explanation and to not obscure embodiments. Further, embodiments encompass present and future known equivalents to the components referred to herein by way of illustration.

Figure 1:
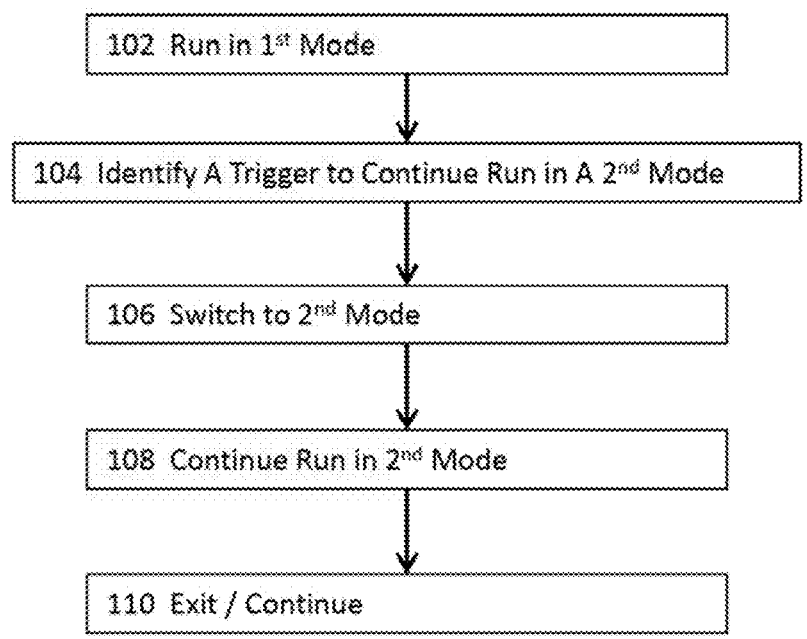
FIG. 1 illustrates a high level flow diagram of a method or system for using multiple modes in execution of a program in some embodiments.

FIG. 1 illustrates a high level flow diagram of a method or system for using multiple modes in execution of a program in some embodiments. In one or more embodiments, the method or the system for using multiple modes in execution of a program comprises the process or module 102 for performing, starting, continuing, or resuming the execution of a program in a first mode. In various embodiments, run or execution (hereinafter execution) of a program comprises the process by which a computer system or a virtual machine carries out a series of instructions of the program. The series of instructions in the program triggers one or more sequences of actions on the computing system or the virtual machine on which the execution occurs.

In various embodiments, the term "run" and the term "execution" may also be used interchangeably. Programs execute or run within an environment, such as the support from the operating system, dynamic or runtime libraries, or system resources. In some embodiments, an environment comprises a configuration of resources available to the user. In some embodiments, an environment comprises the hardware and the operating system running thereupon. In some embodiments, the environment comprises a definition of the specification (e.g., command path) that a program operates in. In some embodiments, the method or the system enables switching among multiple modes during the execution of a program by sharing the same environment among these multiple modes. In some embodiments, a program comprises a sequence of instructions written to perform one or more tasks for a machine which may include, for example, a computing system. The sequence of instructions may be executed in one or more processors, one or more processor cores, or a combination of one or more processors and one or more processor cores.

In some embodiments, the method or the system for using multiple modes in execution of a program comprises the process or module 104 for identifying a trigger to continue the execution of the program in a second mode. In some embodiments, the first mode or the second mode may comprise a mixed mode that comprises a plurality of modes rather than, for example, a single mode such as a compiled mode, an interpreted mode, etc. In some embodiments, a mixed mode may comprise one or more modes such as the value debugger notification mode or the runtime checks mode in FIG. 2B, etc. In these embodiments, a single trigger indicates a request from a user or from the system to switch the execution of the program into the plurality of modes rather than having one trigger for each of the plurality of modes. For example, the program may execute in a compiled, optimized mode at 102, and the method or the system for identifying a trigger to continue the execution of the program in the debug compiled, optimized mode, the debug compiled, non-optimized mode, the interpreted mode, or any other modes at 104. In some embodiments, a compiled code is translated from a higher level symbolic description or representation (e.g., source code) of a program into a lower level object code prior to execution of the program, and the object code may comprise machine code that is executable or a variation of machine code.

In some embodiments, an interpreted mode comprises execution of a program that is interpreted so as to translate or interpret a statement or instruction of the program into an executable form by using an interpreter. In some embodiments, an interpreter translates or interprets the program one statement at a time into the executable form and executes the translated or interpreted program before the interpreter translates or interprets another statement or instruction. In some embodiments, an interpreter may translate or interpret a first plurality of statements or instructions and execute these translated or interpreted statements or instructions before the interpreter translates or interprets and then executes a second plurality of statements or instructions.

In some embodiments, unlike an interpreter that translates or interprets one or a few statements or instructions at a time, a compiler translates the entire program or routine into a compiled code before executing the compiled code. In some embodiments, a trigger may comprise one or more user actions, one or more system states, or one or more environment states, etc. For example, a user may halt the execution of a compiled, optimized executable of the program via various means and indicate the user's intent to continue the execution of the same program in an interpreted mode. In some embodiments, an executable of a program may comprise an executable file that causes a computing system to perform tasks accorded to encoded instructions (e.g., machine code instructions for a processor or a processor core).

In some embodiments, an executable comprises a file including instructions for a software interpreter, a software translator, or a software compiler. In some of these embodiments, a scripting language source may also be considered as an executable. In some embodiments, the method or the system for using multiple modes in execution of a program comprises the process or module 106 for switching the execution of the program to the second mode according to the trigger and the process or module 108 for continuing the execution of the program in the second mode. In various embodiments, the method or the system may switch to the second mode to continue the execution of the program without recompiling a source code or an intermediate code of the program. In these embodiments, the developer or programmer of the program need not stop to recompileThe environment for the second mode and to restart from the beginning of the newly recompiled second mode in order to switch to the second mode to continue execution of the program.

In some embodiments, a code or a representation of a program comprises one or more rules of converting a piece of information or data into another form or representation that is not necessarily of the same type. In some embodiments, a code or a representation of a program comprises one or more statements or one or more sequences of instructions that may be directly or indirectly (such as after interpretation, translation, or compilation) executed on a processor. In some embodiments, a code or a representation of a program comprises one or more program instructions or a system of symbols that is used to convert information from one form to another or to represent information. At 110, the execution may continue or exit upon the completion of the execution. More details about the processes or modules of FIG. 1 will be described in greater details in some of the subsequent paragraphs with reference to one or more figures.

Figure 2A:
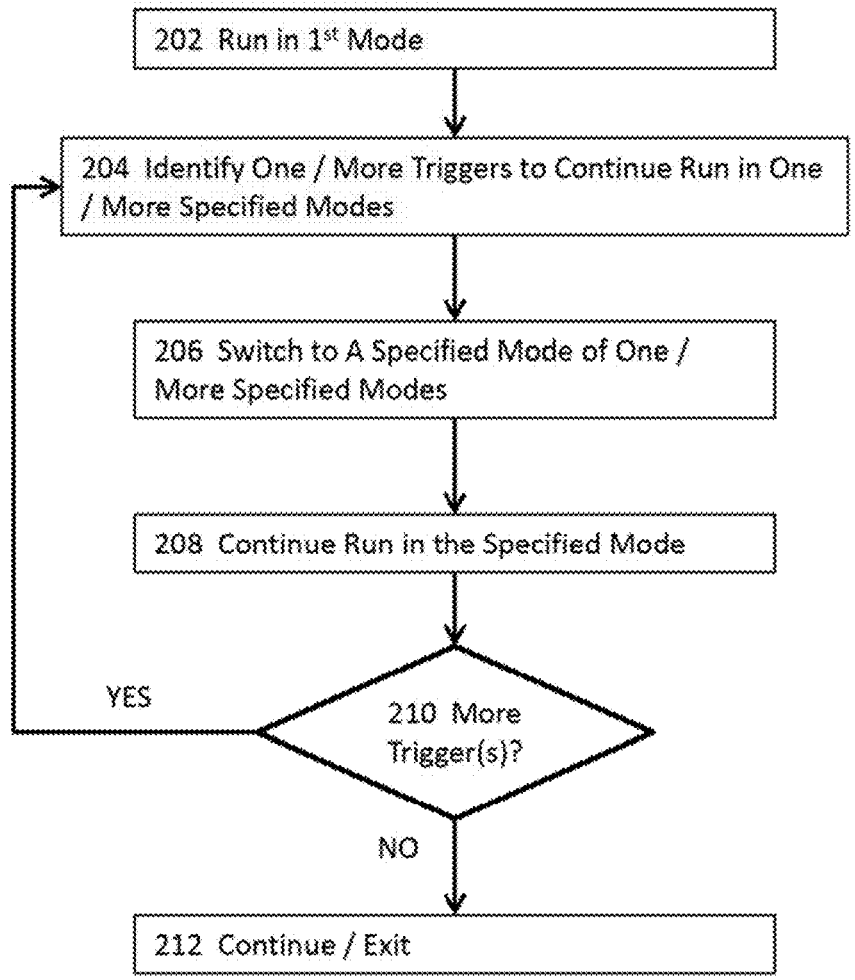
FIG. 2A illustrates another high level flow diagram of a method or system for using multiple modes in execution of a program in some embodiments.

FIG. 2A illustrates another high level flow diagram of a method or system for using multiple modes in execution of a program in some embodiments. In some embodiments, the method or the system for using multiple modes in execution of a program comprises the process or module 202 for performing, starting, continuing, or resuming the execution of a program in a first mode. In some embodiments, the method or the system may further comprise the process or module 204 for identifying one or more triggers to continue the execution in one or more specified modes. In some embodiments, the one or more specified modes are specified in the corresponding one or more triggers.

In some embodiments, the method or the system may further comprise the process or module 206 for switching to one of the one or more specified modes to continue execution of the program. In some embodiments, the method or the system may further comprise the process or module 208 for continuing the execution in the specified mode. In various embodiments, the method or the system may switch to the specified mode to continue the execution of the program without recompiling a source code or an intermediate code of the program. In these embodiments, the developer or programmer of the program need not stop to recompile the environment for the specified mode and to restart from the beginning of the newly recompiled specified mode in order to switch to the specified mode to continue execution of the program.

In some embodiments, the method or the system may further comprise the process or module 210 for identifying or determining whether there exist one or more triggers to continue the execution in one or more specified modes. In some embodiments where the method or the system identifies or determines that there exist at least one trigger to continue the execution of the program in a specified mode, the method or the system loops back to 204 to identify this at least one trigger in some embodiments. In some embodiments where the method or the system does not identify any more triggers or determines that there exist no more triggers to switch to a specified mode, the method or the system may proceed to 212 to continue or exit upon the completion of the execution of the program.

FIG. 2B illustrates some exemplary pseudo code for the corresponding modes of execution of a program in some embodiments. 252 denotes an exemplary user method in a verification language that defines a routine "a_method( )". 254 denotes an exemplary user method in a lower level language for the routine "a_method( )" which may be translated, interpreted, or compiled by the corresponding translator, interpreter, or compiler. In this exemplary pseudo code, the code as shown in 254 executes in a compiled, fully optimized mode for the user method in a lower level language.

A compiled, optimized executable code may be modified to make some aspects of it work or execute with more efficiency or use fewer resources. Such a compiled, optimized code may be optimized at the design level, the source code level, the compile level, the assembly level, or at runtime for various optimization goals or purposes. 256 denotes another exemplary user method in a lower level language. In this exemplary pseudo code, the code as shown in 256 executes in a runtime debugger notification mode. 258 denotes another exemplary user method in a lower level language. In this exemplary pseudo code, the code as shown in 258 executes in a value debugger notification mode. 260 denotes another exemplary user method in a lower level language. In this exemplary pseudo code, the code as shown in 260 executes in a runtime checks mode.

Figure 2C:
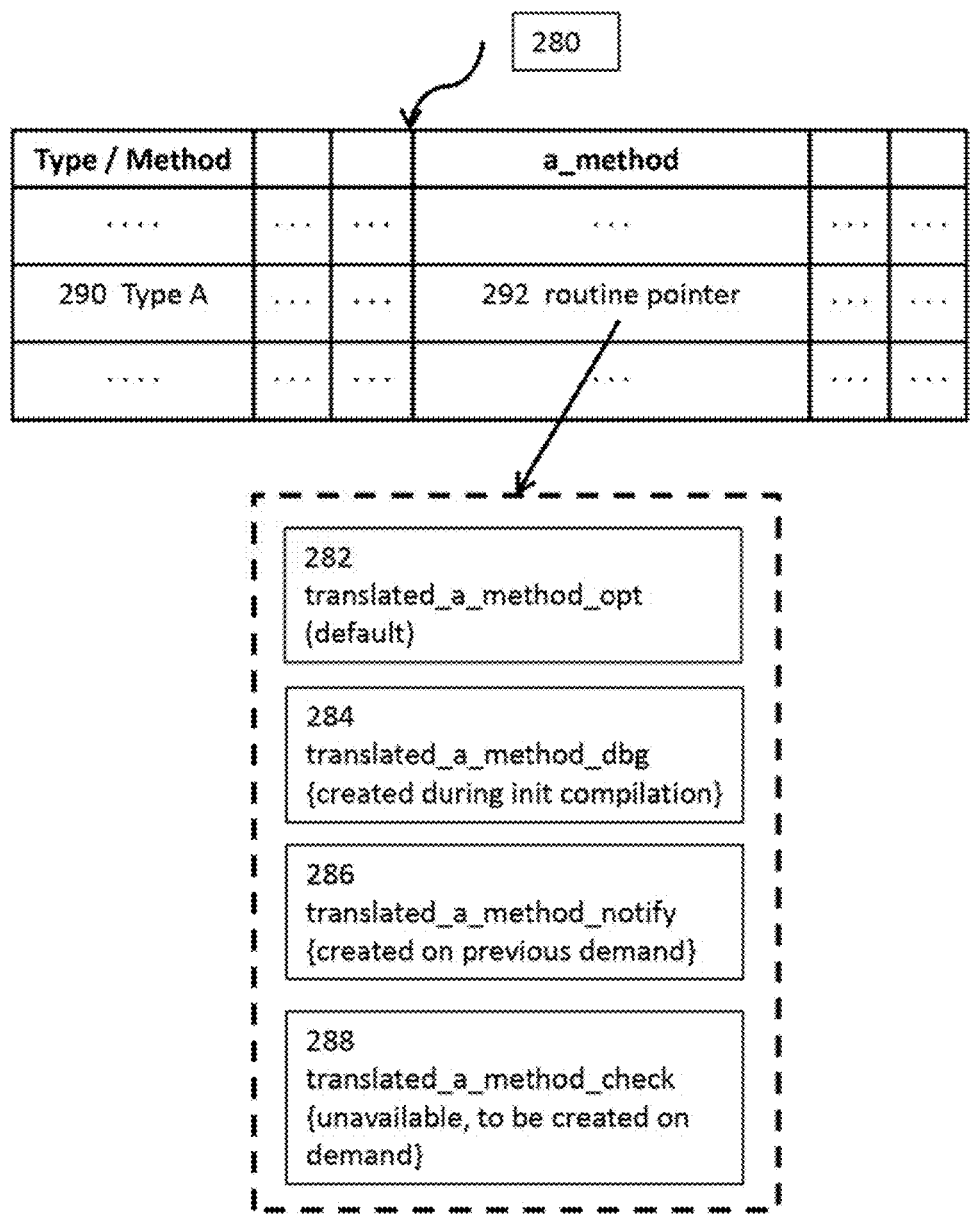
FIG. 2C illustrates an exemplary dispatch table with some exemplary modes of execution of a program in some embodiments.

FIG. 2C illustrates an exemplary dispatch table with some exemplary modes of execution of a program in some embodiments. More specifically, 280 denotes an exemplary dispatch table which comprises an object 290 and a routine pointer 292 which points to a function, method, or routine (hereinafter routine) such as 282, 284, 286, or 288. It shall be noted that FIG. 2C illustrates four routines, each of which may be pointed to by a routine pointer (e.g., 292) in the dispatch table 280 for illustrative purposes. Nonetheless, routine pointers in the dispatch table may point to more or fewer routines than the four routines in FIG. 2C. A dispatch table or a function pointer as illustrated as 280 comprises one or more pointers to routines for implementing late binding in object-oriented programming. In some embodiments, the method or the system uses one or more dispatch table for switching among different modes. In some embodiments, the method or the system may modify or replace the addresses of various routines in the code for switching among different modes. In some embodiments, the method or the system may configure a method call in machine language to include the correct address pointer for the desired routine to switch into.

Figure 3:
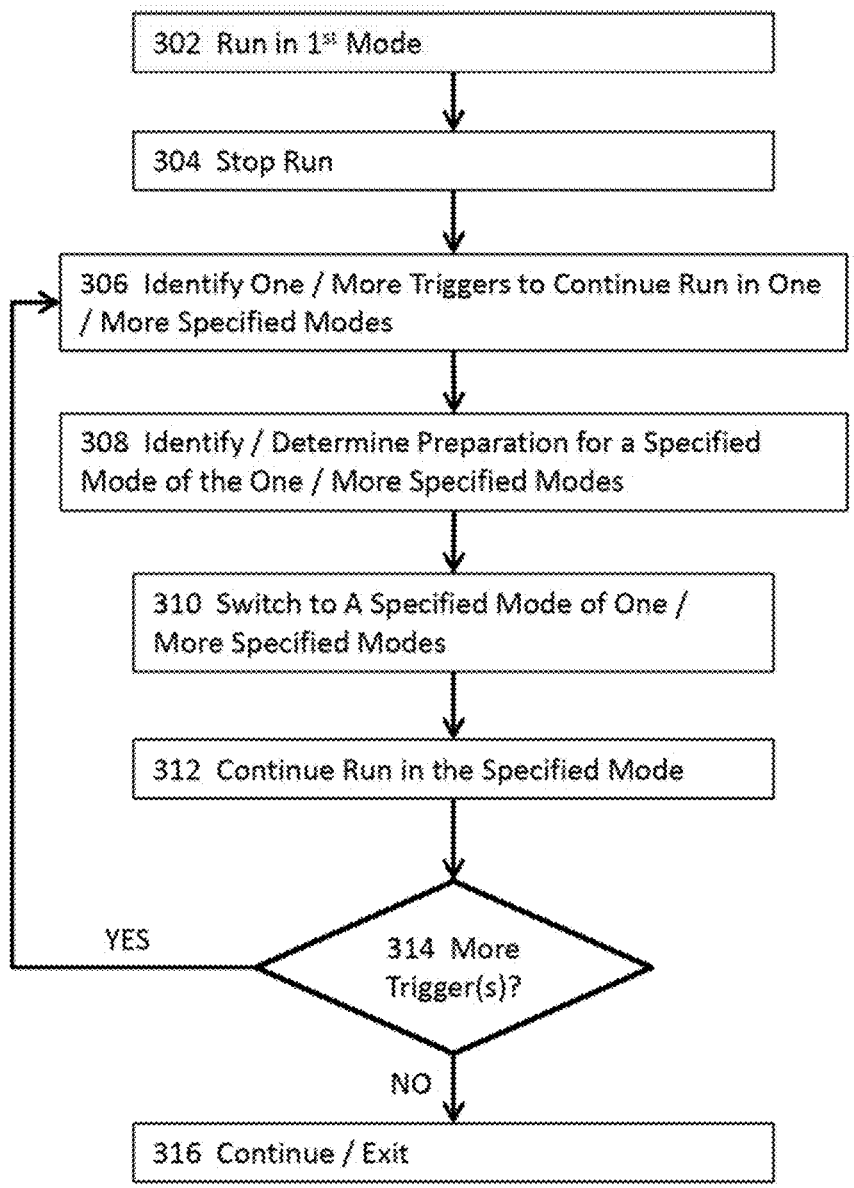
FIG. 3 illustrates a more detailed high level flow diagram of a method or system for using multiple modes in execution of a program in some embodiments.

FIG. 3 illustrates a more detailed high level flow diagram of a method or system for using multiple modes in execution of a program in some embodiments. In some embodiments, the method or the system for using multiple modes in execution of a program comprises the process or module 302 for performing, starting, continuing, or resuming the execution of a program in a first mode. In some embodiments, the method or the system may comprises the process or module 304 for stopping the execution of the program. In some embodiments, the method or the system stops the execution temporarily for various purposes as further described in some of the subsequent paragraphs, and that the method or the system may continue or resume the execution after such various purposes have been served. In some other embodiments, the method or the system stops the execution permanently by terminating the execution. For example, the user may initiate a request to stop the execution in some embodiments; the system may initiate a request to stop the execution due to, for example, a system state or an environment state in some other embodiments. In some embodiments, the method or the system for using multiple modes in execution of a program comprises the process or module 306 for identifying one or more triggers to continue the execution in one or more specified modes.

The method or the system may further comprise the process or module 308 for identifying or determining the preparation for a specified mode of the one or more specified modes in some embodiments. More details about the preparation for a specified mode will be described in further details in subsequent paragraphs with reference to one or more figures. Once the preparation for the specified mode is identified or determined anew, the method or the system may then switch to the specified mode of the one or more specified modes at 310. The method or the system may then continue the execution of the program in the specified mode at 312.

At 314, the method or the system may further determine whether there exists more triggers to be processed in some embodiments. If the method or the system determines that there exists a trigger to continue the execution in a specified mode, the method or the system may loop back to 306 to identify such a trigger and repeat the processes or modules of 306-314 until all triggers are processed accordingly in some embodiments. At 316, the method or the system may continue with other execution(s) or exit the execution upon the completion of the execution of the program in some embodiments.

Figure 4A:
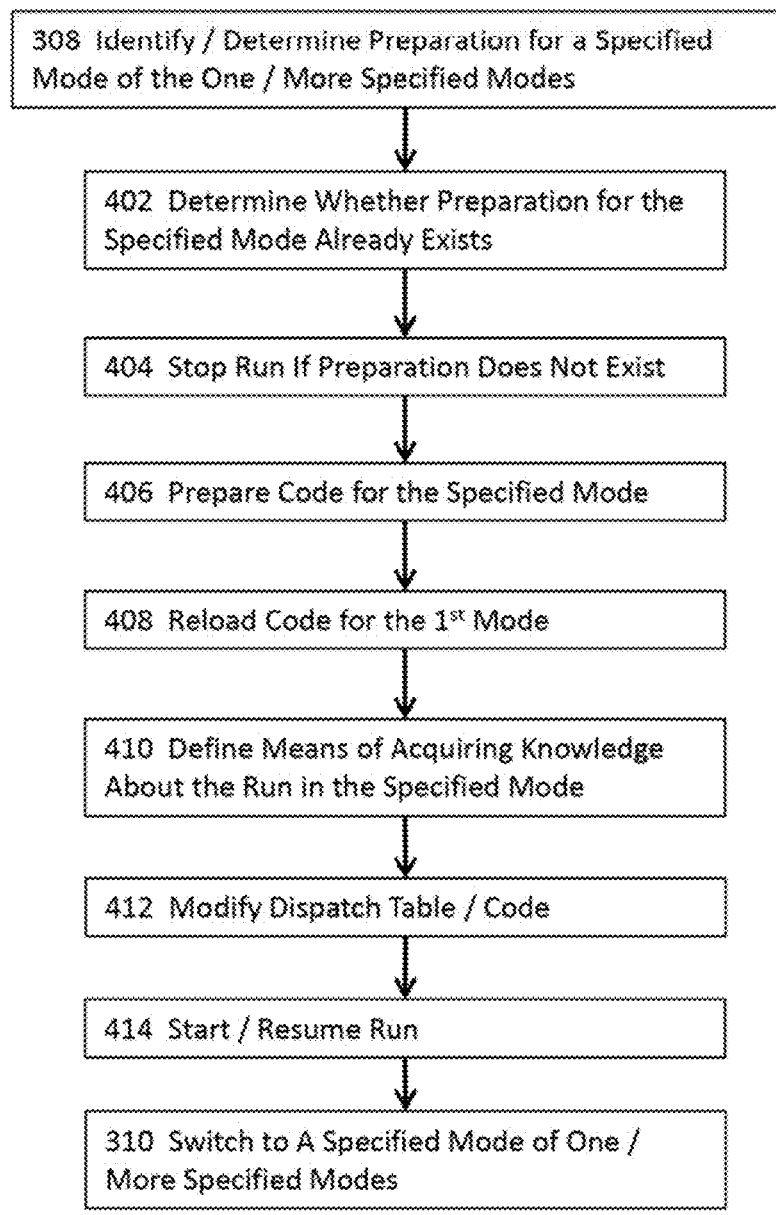
FIG. 4A illustrates a more detailed high level flow diagram of a method or system for using multiple modes in execution of a program in some embodiments.

FIG. 4A illustrates a more detailed high level flow diagram of a method or system for using multiple modes in execution of a program in some embodiments. More particularly, FIG. 4A illustrates a more detailed high level flow diagram of the process or module for identifying or determining the preparation for a specified mode of the one or more specified modes as illustrated in FIG. 3. In some embodiments, the method or the system for using multiple modes in execution of a program comprises the process or module 402 for determining whether the preparation for the specified mode of the execution of the program already exists.

In some embodiments where the method or the system determines that the preparation for the specified mode does not exist, the method or the system may further comprise the process or module 404 for stopping the execution of the program. For example, if the method or the system identifies a trigger to continue the execution of the program in a debugging mode that requires an interpreted version of a portion of the program, but such an interpreted version does not yet exist, the method or the system may then stop the execution of the program in some embodiments. In some embodiments, the method or the system temporarily stops the execution of the program. In these embodiments, the method or the system may further comprise the process or module 406 for preparing the version of the program (hereinafter the code) for the specified mode.

In the above example, the method or the system stops the execution of the program at 404 to prepare the interpreted code for the specified debugging mode at 406. In some embodiments, the method or the system may further comprise the process or module 408 for reloading the original code for the first mode of execution of the program. For example, if the method or the system performs, starts, continues, or resumes the execution of the program with an optimized, compiled executable of the program at 302, the method or the system may stop the execution with the optimized, compiled executable at 404 to prepare the code for the specified mode at 406, and then reloads the optimized, compiled executable for the first mode of execution at 408.

In these embodiments where the code for the first mode is reloaded at 408, one of the advantages is that the execution may be started for purposes of the one or more specified modes (e.g., debugging, tracing, etc.). Another one of the advantages of reloading the code for the first mode is that there is no need for recompiling, re-interpreting, or re-translating the program, and that the subsequent actions (e.g., defining means of acquiring knowledge about the execution in the specified mode at 410) may be established in accordance with the first mode that gives rise to the trigger to continue the execution in a specified mode.

In some embodiments, the method or the system may further comprise the process or module 410 for defining means of acquiring knowledge about the execution in the specified mode. For example, the method or the system may insert one or more breakpoints or conditions for interrupting the execution of the program and their corresponding continue points after each of the breakpoints to inspect the environment (e.g., registers, memory logs, files, etc.) so as to determine whether the program is functioning as designed.

As another example, the method or the system may prepare, for example, the log files, various other processes or modules, etc. for tracing or event logging. In some embodiments, the method or the system may further optionally comprise the process or module 412 for modifying a dispatch table that includes one or more pointers to functions, methods, or routines for late binding in object-oriented programming. For example, if the program calls a routine which is to be debugged or traced, the method or the system may insert a break point at or before the entry of the routine and a corresponding continue point at or after the exist of the routine.

The method or the system may then modify the address of the routine in the dispatch table to point to the desired code (e.g., an interpreted version of the routine). In some embodiments, the method or the system may further comprise the process or module 412 for modifying the addresses of the routine in the corresponding executable of the program or in one or more libraries by replacing the original address of the routine with the address of the desired version of the code. In some embodiments, the method or the system may further comprise the process or module 414 for starting the execution of the program or resuming the execution of the program from or around the last stopping point. The method or the system may then proceed to 310 to switch to the specified mode after the execution is started or resumed at 414.

FIG. 4B illustrates an exemplary switching between two exemplary modes of execution of a program in some embodiments. FIG. 4B illustrates an exemplary, pseudo code for a method call "ObjectA.method_2( )" in an object-oriented language at 452 although such a method call needs not be in an object-oriented language. 454 denotes the corresponding method call in the assembly language that includes moving pointer(s), getting address(es), and dispatching the routine pointer(s). 456 illustrates an exemplary dispatch table which includes the pointer rp2 for the type object A (458) to a compiled routine 462 and other pointers for the type object B (460), whereas 464 schematically illustrates an exemplary structure of the compiled version of the routine. 466 illustrates another exemplary dispatch table which is obtained by modifying the dispatch table 456 with one or more processes or modules disclosed herein. Moreover, 466 shows that the original pointer (rp2) has been replaced with a different pointer (rp2') that points to the interpreted version of the routine 468, whereas 470 schematically illustrates an exemplary structure of the interpreted routine.

Figure 5:
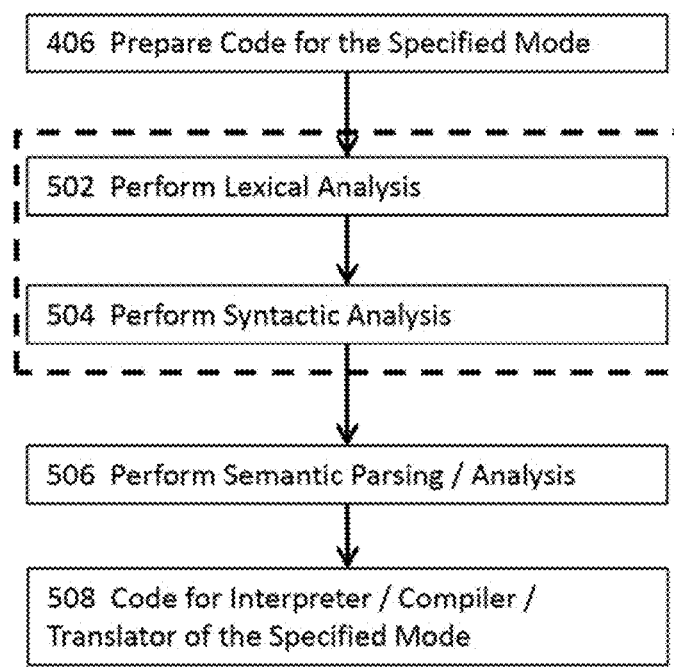
FIG. 5 illustrates more details about the process or module for preparing code for a specified mode of execution of a program in some embodiments.

FIG. 5 illustrates more details about the process or module for preparing code for a specified mode of execution of a program in some embodiments. More particularly, FIG. 5 illustrates more details about the process or module for preparing the code for a specified mode in some embodiments. In some embodiments, the process or module for preparing the code for a specified mode may comprise the process or module 502 for performing the lexical analysis. In some embodiments, the process or module for preparing the code for a specified mode may comprise the process or module 504 for performing the syntactic analysis.

In some embodiments, the process or module for preparing the code for a specified mode may comprise the process or module 506 for performing semantic parsing or analyses. In some embodiments, the process or module for preparing the code for a specified mode may comprise the process or module 508 for generating the code for the corresponding interpreter, compiler, or translator of the specified mode based at least in part upon the code that is needed for the specified mode. More details about the processes or modules in FIG. 5 will be further described in some of the subsequent paragraphs with reference to one or more figures.

Figure 6A:
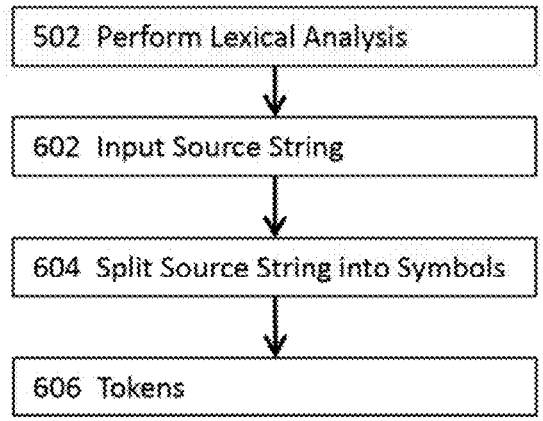
FIG. 6A illustrates more details about the process or module for the process or module for performing lexical analysis in some embodiments.

FIG. 6A illustrates more details about the process or module for the process or module for performing lexical analysis in some embodiments. In some embodiments, the process or module 502 for performing the lexical analysis comprises the process or module 602 for identifying, inputting, or receiving the source string of the program. In some embodiments, the process or module 502 for performing the lexical analysis comprises the process or module 604 for splitting the source string into one or more symbols to generate one or more tokens (606) from the input source string.

Figure 6B:
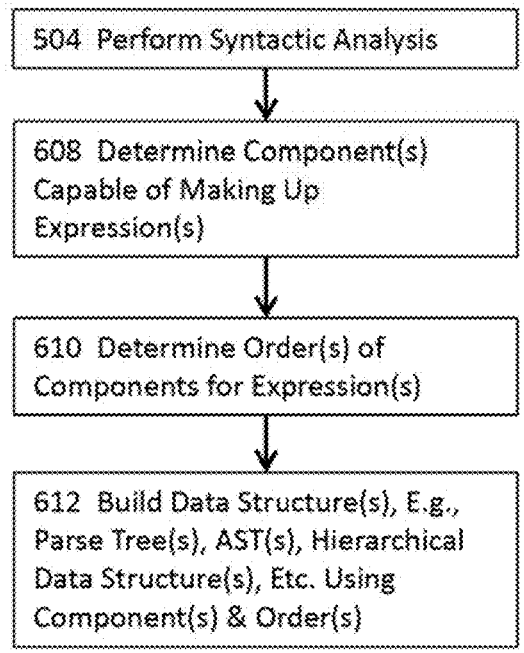
FIG. 6B illustrates more details about the process or module for the process or module for performing syntactic analysis in some embodiments.

FIG. 6B illustrates more details about the process or module for the process or module for performing syntactic analysis in some embodiments. In some embodiments, the process or module 504 for performing the syntactic analysis comprises the process or module 608 for determining one or more components capable of making up one or more expressions. In some embodiments, an expression comprises a combination of symbols (e.g., identifiers, values, operators, etc.) that yields a result upon evaluation. In these embodiments, the resulting value of the evaluation may be assigned to a variable, passed as an argument, tested in a control statement, or used in another expression.

In some embodiments, the process or module 504 for performing the syntactic analysis comprises the process or module 610 for determining one or more orders of components for the one or more expressions. In some embodiments, the process or module 504 for performing the syntactic analysis comprises the process or module 612 for building one or more data structures (e.g., parse tree(s) or other types of data structure(s)) using the one or more components and one or more orders that are determined at 608 and 610.

Figure 6C:
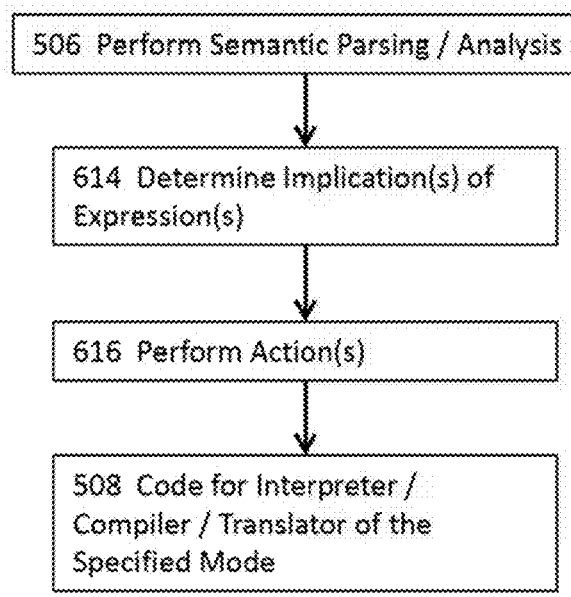
FIG. 6C illustrates more details about the process or module for the process or module for performing semantic parsing or analysis in some embodiments.

FIG. 6C illustrates more details about the process or module for the process or module for performing semantic parsing or analysis in some embodiments. In some embodiments, the process or module 506 for performing the semantic parsing or analysis comprises the process or module 614 for determining one or more implications of the one or more expressions. In some embodiments, the process or module 506 for performing the semantic parsing or analysis comprises the process or module 616 for performing one or more appropriate actions. In some embodiments, the one or more appropriate actions comprise evaluating the one or more expressions or the program by using, for example, various grammars.

In some embodiments, the one or more appropriate actions may comprise generating code for a specified mode. For example, the process or module 616 may generate an interpreted version of the code for debugging in embodiments where the specified mode to switch into includes the debugging mode. In some embodiments, the one or more actions may comprise modifying or replacing a portion of code with a different portion of code or with information that is needed by the interpreter, compiler, or translator of the corresponding, specified mode. In some embodiments, the one or more appropriate actions may comprise identifying or generating one or more records.

For example, the process or module 616 may generate one or more files or data structures to store one or more logs or entries in some embodiments where the specified mode comprises a tracing mode or an event logging mode or in some embodiments where storage of data or information is required. In some embodiments, the process or module 506 for performing the semantic parsing or analysis may continue to the process or module 508 for generating code for the interpreter, compiler, or translator of the specified mode.

As an illustrative, simplified example for the processes or modules depicted in FIGS. 6A-C, the processes or modules may process the input string a*(b+c)−d and split the input string into tokens such as a, *, (, b, +, c, ), −, and d, each of which may constitute a meaningful symbol in the context of Boolean or arithmetic expression. The processes or modules may further include one or more rules such that the processes or modules may know, for example, that the tokens *, (, +,), and − represents the start of a new token such that the processes or modules will not generate meaningless tokens such as a*, (b, b+, +c, c), )−, or −d. The processes or modules illustrated in FIGS. 6A-C may then perform the syntactic analysis to determine allowable expression(s) (e.g., (b+c), a*(b+c), and a*(b+c)−d, etc.) by using, for example, certain grammars such as attribute grammars or context-free grammars that define components which may make up an expression and the order in which the components must appear in the expression in some embodiments. The processes or modules may then determine the implications of the expression and determine the corresponding or appropriate actions in a substantially similar manner as described in the preceding paragraphs with reference to FIGS. 6A-C.

In some embodiments, the one or more data structures comprise, for example but not limited to, one or more parse trees, one or more abstract syntax trees (ASTs), one or more hierarchical data structures, a combination of any of the above, or one or more other types of data structures. In some embodiments, rather than a pure compilation or a pure interpretation approach, the processes or modules may transform the input string into an optimized abstract syntax tree and then execute the input string following the structure of the abstract syntax tree. In these embodiments, each sentence of the input string needs to be parsed just once, and the abstract syntax tree keeps the structure of the input string of a program and the relations between statements in contrast with the bytecode approach during which the relations between the statements will be lost in the bytecode representation. In some embodiments, the processes or modules generate the abstract syntax tree as an intermediate format for, for example but not limited to, just-in-time compilers.

In some embodiments, a parse tree, a parsing tree, or a concrete syntax tree comprise a tree that represents the syntactic structure of an input string according to some formal grammar. In these embodiments, the interior nodes of a parse tree may be labeled by non-terminals of certain grammar, while the leaf nodes are labeled by terminals of the grammar. In some embodiments, the process or modules may generate a parse tree for sentences in natural languages or any programming languages. A node in a parse tree may be a root node, a branch node, or a leaf node, depending upon where the node is located. A node in a parse tree may also be a parent node or a child node, depending upon its relationship with other nodes. For example, a parent node may comprise a node that has at least one other node linked by a branch under the parent node. A parse tree is distinct from an abstract syntax tree in that the structure and elements of a parse tree more concretely reflect the syntax of the input language.

In some embodiments, the one or more data structures may be generated for execution by an interpreter which comprises a computer program that performs instructions written in a programming language. In a first set of embodiments, an interpreter may execute the source code directly. In a second set of embodiments, an interpreter may translate source code into some intermediate representation and then execute such an intermediate representation. In a third set of embodiments, an interpreter may explicitly execute stored precompiled code that is created by a compiler which is a part of the interpreter system.

In some embodiments, an interpreter may comprise a combination of those of the second set of embodiments and of the third set of embodiments. In some embodiments, an interpreter interprets an input program into bytecode which may be compressed or optimized if needed or desired. In some embodiments, a compiler perform a process to convert some source code or intermediate representation of the source code into a form, such as a machine code, that may be executed by a machine such as a computing system.

The input to a compiler may include, for example but not limited to, a parse tree or an abstract syntax tree. The input to a compiler is converted into an intermediate format, such as but not limited to a linear sequence of instructions in some language format (e.g., the three address code). The compiler may then further convert this intermediate format into instructions from the instruction set of a target machine without requiring a tree traversal in some embodiments. As it may be seen from the pure compilation, pure interpretation, and the approaches generating one or more data structures, the method or the system may accommodate all possible representations of a program regardless of its format (e.g., source code, intermediate representation(s), compiled code, etc.) by using different processes or modules (e.g., by using an interpreter for a source code or a compiler for a compiled code) to perform various functions to achieve the intended purposes.

Figure 7:
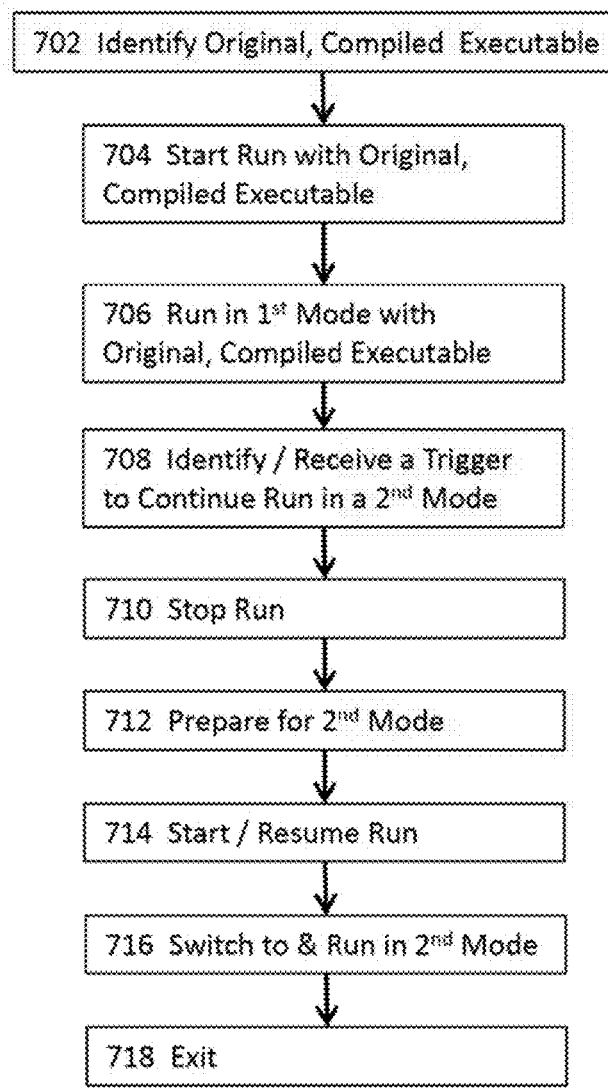
FIG. 7 illustrates an exemplary high level flow diagram of a method or system for using multiple modes in execution of a program in some embodiments.

FIG. 7 illustrates an exemplary high level flow diagram of a method or system for using multiple modes in execution of a program in some embodiments. In one or more embodiments, the method or system for using multiple modes in execution of a program may comprise the process or module 702 for identifying an original, compiled executable of a program. For example, the method or the system may identify or determine (e.g., by compilation) an original, optimized, and compiled executable for the program at 702 in some embodiments.

It shall be noted that the term "optimized" does not necessarily mean that the executable is optimal and may generally refer to an executable that may be optimized with respect to a specific context (e.g., a specific runtime environment on a specific target machine). In some embodiments, the method or the system may further comprise the process or module 704 for starting, resuming, or continuing the execution with the original, compiled executable of the program. In some embodiments, the method or the system may further comprise the process or module 706 for continuing the execution of the program in a first mode with the original, compiled executable of the program. For example, the method or the system may continue the execution of an original, compiled executable of a program for verification purpose in the optimized, compiled mode for greater efficiency in, for example, execution time or use of resources.

In some embodiments, the method or the system may further comprise the process or module 708 for identifying or receiving a trigger to continue the execution of the program in a second mode. For example, the method or the system may identify a request from a user or from a system to continue the execution of the program in a debugging mode, a tracing mode, an event logging mode, or any modes other than the optimized, compiled mode in some embodiments. In some embodiments, the method or the system may further comprise the process or module 710 for stopping the execution of the program. For example, the method or the system may stop the execution of the program in the optimized, compiled mode in some embodiments where the method or the system determines that the preparation for execution in the second mode does not exist or has not been completed.

In some embodiments, the method or the system may further comprise the process or module 712 for preparing for execution in the second mode. In some embodiments, the method or the system may prepare for the execution in the second mode in a substantially similar manner as those described in some of the preceding paragraphs. In some embodiments, the method or the system may further comprise the process or module 714 for starting or resuming the execution of the program. In some embodiments, the method or the system may further comprise the process or module 716 for switching to a second mode and for continuing the execution in the second mode with the results of process or module 712. In some embodiments, the method or the system may further comprise the process or module 718 for continuing with other execution of other program(s) or exiting the execution of the program depending upon what the user requires or desires or what the system is configured or programmed to perform.

Figure 8:
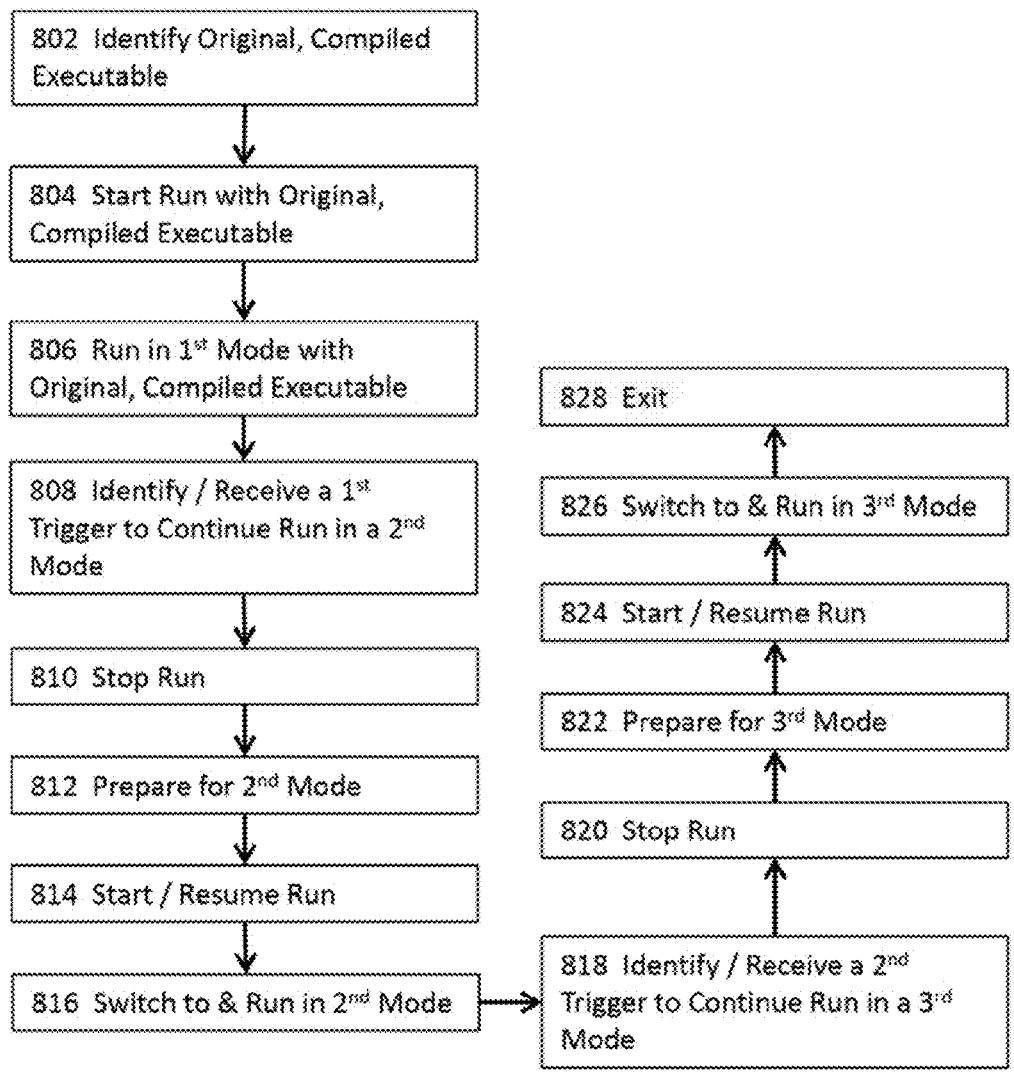
FIG. 8 illustrates an exemplary high level flow diagram of a method or system for using multiple modes in execution of a program in some embodiments.

FIG. 8 illustrates an exemplary high level flow diagram of a method or system for using multiple modes in execution of a program in some embodiments. In one or more embodiments, the method or system for using multiple modes in execution of a program may comprise the process or module 802 for identifying or determining an original, compiled executable of the program. In some embodiments where the original, compiled executable already exists, the method or system then identifies the original, compiled executable. In some other embodiments where the original, compiled executable does not yet exist, the method or the system may then invoke the appropriate compiler, interpreter, or translator to determine the original, compiled (or interpreted or translated) executable.

In some embodiments, the method or the system may comprise the process or module 804 for starting, continuing, or resuming the execution of a program with the original, compiled executable. In some embodiments, the method or the system may comprise the process or module 806 for performing the execution in a first mode with the original, compiled executable of the program. In some embodiments, the method or the system may comprise the process or module 808 for identifying or receiving a trigger to continue the execution in a second mode. In some embodiments, the method or the system may comprise the process or module 810 for stopping the execution of the program in the first mode.

For example, the method or the system may stop the execution of the program in the optimized, compiled mode in some embodiments where the method or the system determines that the preparation for execution in the second mode does not exist or has not been Completed. In some embodiments, the method or the system may comprise the process or module 812 for preparing for execution in the second mode. In some embodiments, the method or the system may comprise the process or module 812 for preparing for execution in the second mode. In some embodiments, the method or the system may comprise the process or module 814 for starting or resuming the execution in the original, compiled executable of the program.

In some embodiments, the method or the system may comprise the process or module 816 for switching to the second mode and continuing the execution in the second mode. In some embodiments, the method or the system may comprise the process or module 818 for identifying or receiving a second trigger to continue the execution in a third mode. In some embodiments, the method or the system may comprise the process or module 820 for stopping the execution of the program in the second mode. For example, the method or the system may stop the execution of the program in the second mode in some embodiments where the method or the system determines that the preparation for execution in the third mode does not exist or has not been completed.

In some embodiments, the method or the system may comprise the process or module 822 for preparing for execution of the program in the third mode. In some embodiments, the method or the system may prepare for execution of program in the third mode in substantially similar manner as those described in some of the preceding paragraphs. In some embodiments, the method or the system may comprise the process or module 824 for starting or resuming the execution of the program in the second mode. In some embodiments, the method or the system may comprise the process or module 826 for switching to the third mode and continuing the execution in the third mode. In some embodiments, the method or the system may comprise the process or module 828 for continuing with other execution of other program(s) or exiting the execution of the program depending upon what the user requires or desires or what the system is configured or programmed to perform.

Figure 9:
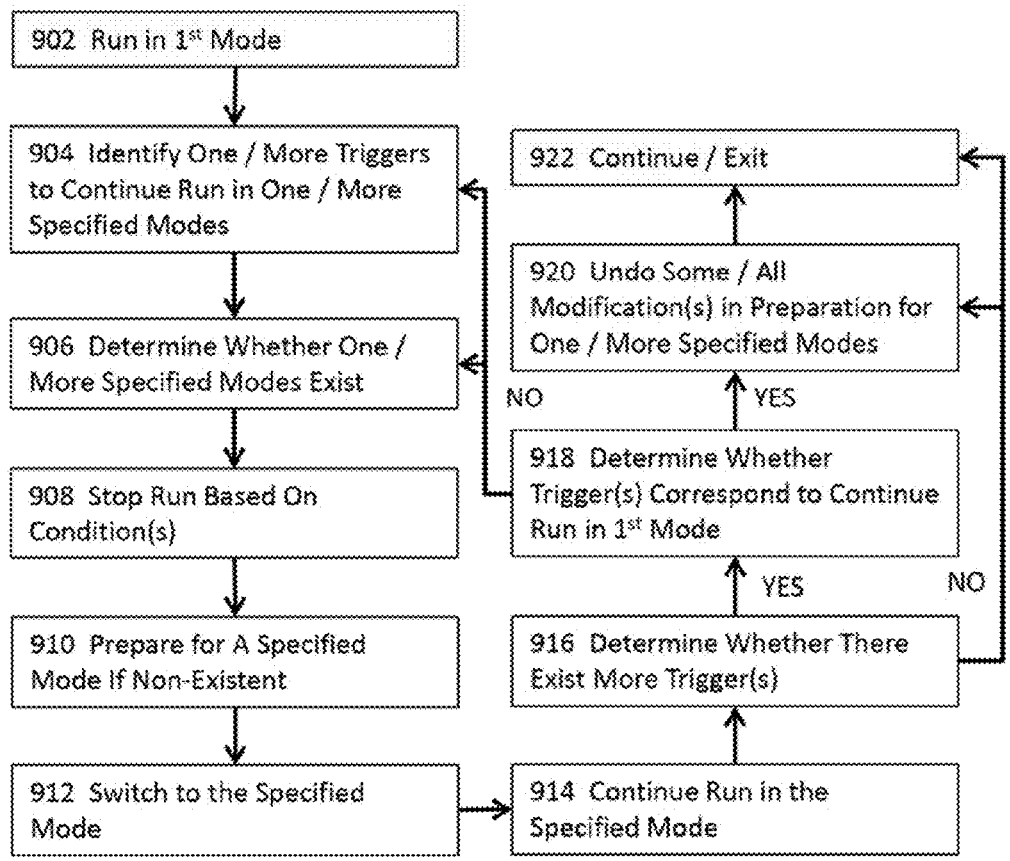
FIG. 9 illustrates an exemplary high level flow diagram of a method or system for using multiple modes in execution of a program in some embodiments.

FIG. 9 illustrates an exemplary high level flow diagram of a method or system for using multiple modes in execution of a program in some embodiments. In one or more embodiments, the method or system for using multiple modes in execution of a program may comprise the process or module 902 for starting, continuing, or resuming the execution of a program in a first mode. In some embodiments, the method or system may comprise the process or module 904 for identifying one or more triggers to continue the execution in one or more specified modes. In some embodiments, the method or system may comprise the process or module 906 for determining whether or not the one or more specified modes exist.

In some embodiments, the method or system may comprise the process or module 908 for stopping the execution of the program in the first mode. In some embodiments, the method or system may comprise the process or module 910 for preparing for the execution of the program in a specified mode if the method or the system determines that the execution of the program in such a specified mode does not yet exist. In some embodiments, the method or system may comprise the process or module 912 for starting or continuing the execution of the program in the first mode and switching to the specified mode to continue the execution of the program in the specified mode. In some embodiments, the method or system may comprise the process or module 914 for continuing the execution of the program in the specified mode.

In some embodiments, the method or system may comprise the process or module 916 for determining there exists an additional trigger to continue the execution of the program in the first mode or in one or more specified modes. In some embodiments, the method or the system may determine whether there exists an additional trigger to return to the first mode of execution at 916. In some embodiments, such an additional trigger may comprise a continue point to exit the routine execution in a specified mode and to return to the first mode after the completion of the execution of the routine in the specified mode. In some embodiments, such an additional trigger may comprise a trigger to continue the execution of the program in another specified mode of the one or more specified modes.

In some embodiments, the method or system may comprise the process or module 918 for determining whether the additional trigger corresponding to a trigger to return the execution in the specified mode back to the execution in the first mode. For example, the method or the system may determine whether the additional trigger constitutes a continue point after a breakpoint such that the execution of the program exits the execution of the program in the specified mode entered into in response to the trigger identified at 904 and returns to first mode. In some embodiments where the method or system determines that the identified, additional trigger does request returning the execution back to the first mode, the method or the process may further comprise the process or module 920 for undoing some or all the modifications made during the preparation for the execution of the program in the specified mode in these embodiments.

For example, the method or the system may undo some or all of the changes made to the entries in the dispatch table where the method or system changes the address(es) of one or more routines for the execution of the one or more routines in the first mode to the address(es) of the corresponding one or more routines for the execution of the corresponding one or more routines in the specified mode identified at 904 in some embodiments. As another example, the method or the system may undo the change(s) made to one or more addresses in the code of the program for executing the program in the specified mode. In some embodiments where the method or the system determines at 918 that the additional trigger does not request to return the execution of the program back to the first mode, the method or system may loop back to 904 to identify such an additional trigger or to 906 if the additional trigger has already been identified as a result of the process or module at 916 or 918 and repeat the processes or modules as described above.

In some embodiments where the method or system determines that there exist no other triggers at 916, the method or the system may proceed to 922 for continuing with other execution of other program(s) or exiting the execution of the program depending upon what the user requires or desires or what the system is configured or programmed to perform. In some embodiments where the method or system determines that there exist no other triggers at 916, the method or the system may proceed to 920 for undoing some or all the modifications made during the preparation for the execution of the program in the specified mode in these embodiments in a substantially similar manner as that described above for the process or module 920.

Figure 10:
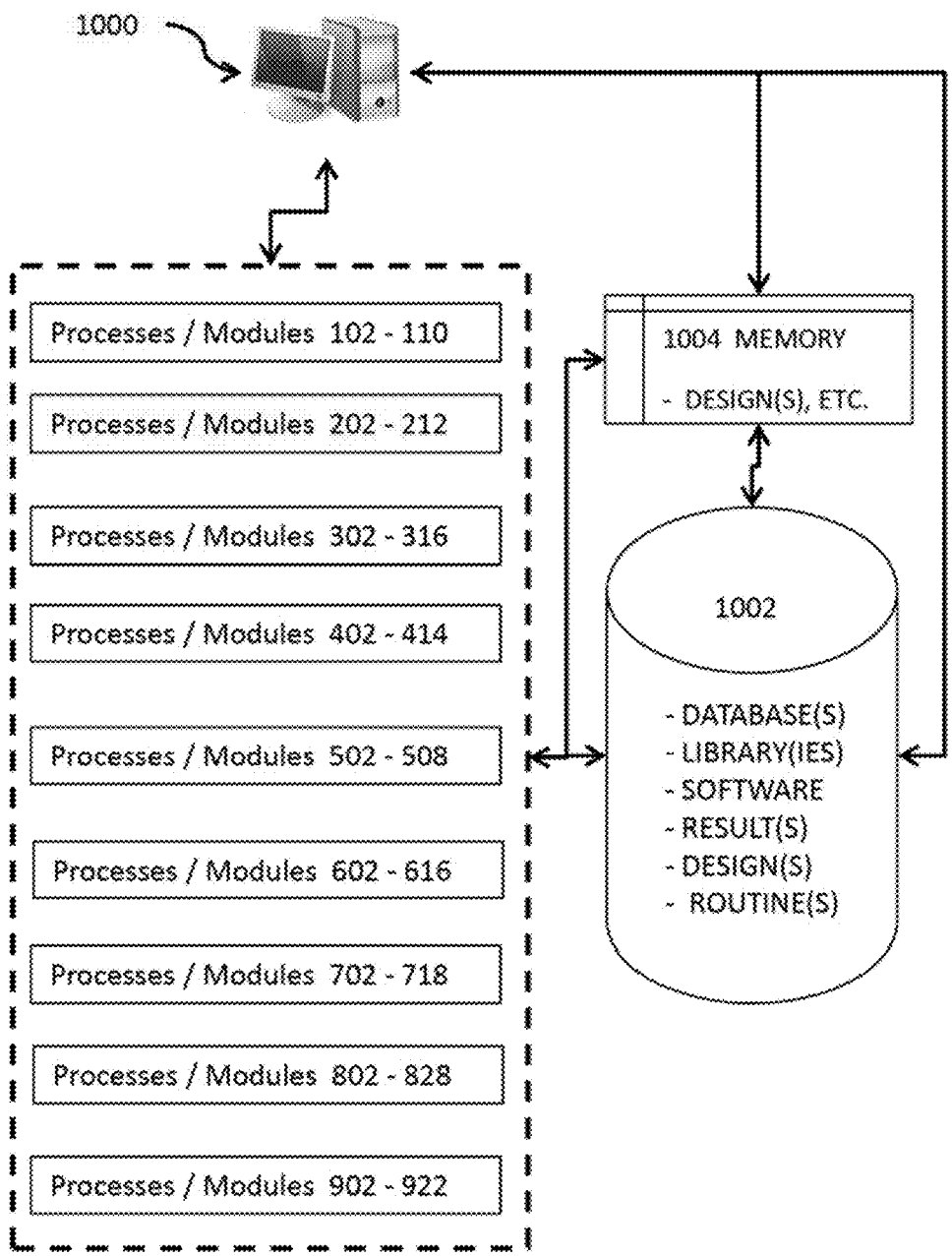
FIG. 10 illustrates an exemplary system for using multiple modes in execution of a program in some embodiments.

FIG. 10 illustrates an exemplary system for using multiple modes in execution of a program in some embodiments. In one or more embodiments, the exemplary system comprises a computing system 1000 which includes at least one processor with one or more processor cores, each of which executes one or more threads of execution. The exemplary system further comprises some form(s) of non-transitory machine or computer accessible storage media 1002 that includes, for example but not limited to, database(s), data structure(s), libraries, various software, routines, one or more electronic circuit designs, or various results of the execution or performance of various processes or modules.

The exemplary system may further comprise some form(s) of non-transitory machine or computer accessible storage media 1004 which includes, for example but not limited to, various software representations for verification, various other software code (e.g., compiler, interpreter, translator, libraries, routines, etc.), libraries, initial, intermediate, or final results of various processes or modules, or any other information or data required, desired, or generated during the performance of various processes or the execution of various modules related to various embodiments described herein. The computing system may locally comprise or remotely interact with the non-transitory machine or computer accessible storage media 1002 and 1004 in various embodiments.

The computing system 1000 may also either locally perform or remotely invoke various processes or modules such as one or more processes or modules for identifying, performing, determining, stopping, preparing, switching, continuing, resuming, modifying, interpreting, compiling, translating, parsing, analyzing, generating, building, splitting, loading, reloading, or defining as described with reference to processes or modules 102-110, 202-212, 302-316, 402-414, 502-508, 602-616, 702-708, 802-828, or 902-922. More details about a computing system and its various components or modules will be described in greater details in some of the subsequent paragraphs with reference to FIG. 11.

System Architecture Overview

FIG. 11 illustrates a block diagram of components of an illustrative computing system 1100 suitable for implementing various embodiment of the invention. For example, the exemplary computing system 1100 may be used to implement various processes as described in the preceding paragraphs and the figures such as various processes or modules of determining whether the first post is of interest, various analysis processes or modules, various other determining processes or modules, various processes or modules for performing various actions, etc. as described in the remainder of the Application. Computer system 1100 includes a bus 1106 or other communication mechanism for communicating information, which interconnects subsystems and devices, such as processor 1107, system memory 1108 (e.g., RAM), static storage device 1109 (e.g., ROM), disk drive 1110 (e.g., magnetic or optical), communication interface 1114 (e.g., modem or Ethernet card), display 1111 (e.g., CRT or LCD), input device 1112 (e.g., keyboard), and cursor control (not shown).

According to one embodiment of the invention, computer system 1100 performs specific operations by one or more processors or processor cores 1107 executing one or more sequences of one or more instructions contained in system memory 1108. Such instructions may be read into system memory 1108 from another computer readable/usable storage medium, such as static storage device 1109 or disk drive 1110. In alternative embodiments, hard-wired circuitry may be used in place of or in combination with software instructions to implement the invention. Thus, embodiments of the invention are not limited to any specific combination of hardware circuitry and/or software.

In one embodiment, the term "logic" shall mean any combination of software or hardware that is used to implement all or part of the invention. In the single embodiment or in some embodiments, the one or more processors or processor cores 1107 may be used to perform various actions such as various actions, processes, or modules involving determining, analyzing, performing actions, etc. In some embodiments, at least one of the one or more processors or processor cores 1107 has the multithreading capability.

In one embodiment, the term "logic" shall mean any combination of software or hardware that is used to implement all or part of the invention. In the single embodiment or in some embodiments, the one or more processors or processor cores 1107 may be used to perform various acts such as various acts involving determining, analyzing, performing actions, etc. In some embodiments, at least one of the one or more processors or processor cores 1107 has the multithreading capability to execute a plurality of threads to perform various tasks as described in the preceding sections.

Various actions as described in the preceding paragraphs may be performed by using one or more processors, one or more processor cores, or combination thereof 1107. For example, various processes or modules involving the determining action, various analysis processes or modules, etc. may be performed by one or more processors, one or more processor cores, or combination thereof.

The term "computer readable storage medium" or "computer usable storage medium" as used herein refers to any non-transitory medium that participates in providing instructions to processor 1107 for execution. Such a medium may take many forms, including but not limited to, non-volatile media and volatile media. Non-volatile media includes, for example, optical or magnetic disks, such as disk drive 1110. Volatile media includes dynamic memory, such as system memory 1108.

Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), a magnetic tape, any other magnetic or a magneto-optical medium, CD-ROM, any other optical medium, punch cards, paper tape, any other physical medium with patterns of holes, RAM, PROM, EPROM, FLASH-EPROM, any other memory chip or cartridge, or any other medium from which a computer can read. For example, the various forms of computer readable storage media may be used by the methods or the systems to store either temporarily or permanently information or data such as the one or more master regions, one or more master output layers, one or more global scratch layers, various transforms and inverse transforms, shapes, etc.

In an embodiment of the invention, execution of the sequences of instructions to practice the invention is performed by a single computer system 1100. According to other embodiments of the invention, two or more computer systems 1100 coupled by communication link 1115 (e.g., LAN, PTSN, or wireless network) may perform the sequence of instructions required to practice the invention in coordination with one another.

Computer system 1100 may transmit and receive messages, data, and instructions, including program, i.e., application code, through communication link 1115 and communication interface 1114. Received program code may be executed by processor 1107 as it is received, and/or stored in disk drive 1110, or other non-volatile storage for later execution. In an embodiment, the computer system 1100 operates in conjunction with a data storage system 1131, e.g., a data storage system 1131 that contains a database 1132 that is readily accessible by the computer system 1100. The computer system 1100 communicates with the data storage system 1131 through a data interface 1133. A data interface 1133, which is coupled to the bus 1106, transmits and receives electrical, electromagnetic or optical signals that include data streams representing various types of signal information, e.g., instructions, messages and data. In embodiments of the invention, the functions of the data interface 1133 may be performed by the communication interface 1114.

In the foregoing specification, various embodiments have been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

What is claimed is:

1. A computer implemented method for using multiple modes in execution of a program, comprising:
    using at least one processor of a computing system for performing a process, the process comprising:
    initiating, continuing, or resuming execution of the program in a first mode using a first code of a first portion of the program;
    identifying a single trigger to switch the execution of the program multiple times among multiple modes including the first mode and a second mode;
    determining whether preparation that comprises a second code for the second mode exists, further comprising:
        when the preparation for the second mode is determined not to exist, stopping the execution of the program in the first mode and generating the preparation, generating the preparation further comprising at least one of:
        modifying a dispatch table at or before an entry point of a second portion of the program in the execution of the program in the first mode; or modifying an address at or before the entry point of the second portion of the program in the execution of the program in the first mode;
    switching to the second mode in response to the single trigger to improve performance of the execution of the program without re-executing the first portion of the program and without compiling a source code or an intermediate code of the program for switching to the second mode, wherein the switching is implemented by using the dispatch table with entries associated with the multiple modes and selecting an entry of the dispatch table corresponding to the second mode;

generating the second code of the second portion of the program for the execution of the program in the second mode, wherein the first portion is different from the second portion; and continuing the execution of the program with the second code in the second mode.

2. The computer implemented method of claim 1, further comprising:

determining whether there exists an additional trigger to continue the execution in a specified mode.

3. The computer implemented method of claim 1, the process further comprising:

reloading the first code of the first portion of the program; and continuing the execution of the program in the first mode using the first code without restarting the execution of the program.

4. The computer implemented method of claim 1, wherein the action of generating the preparation for the execution of the program in the second mode comprises:

defining means of acquiring knowledge about the execution of the program in the second mode.

5. The computer implemented method of claim 4, wherein the action of generating the preparation for the execution of the program in the second mode further comprises:

performing lexical analysis on a representation of the program;

performing a syntactic analysis on the representation of the program or a modified representation of the program based at least in part upon a result of the act of performing the lexical analysis; and performing a semantic analysis based at least on a result of the act of performing the syntactic analysis.

6. The computer implemented method of claim 5, wherein the action of generating the preparation for the execution of the program in the second mode further comprises:

generating the second code based at least in part upon a result of the action of performing the semantic analysis.

7. The computer implemented method of claim 5, wherein the action of performing the lexical analysis on the representation of the program comprises:

identifying a source string of the representation of the program; and splitting the source string of the representation of the program into a plurality symbols without generating a meaningless symbol.

8. The computer implemented method of claim 5, wherein the action of performing the syntactic analysis on the representation of the program or the modified representation of the program comprises:

determining one or more components that make up one or more expressions;

determining an order of the one or more components for the one or more expressions; and determining one or more data structures based at least in part upon the order.

9. The computer implemented method of claim 5, wherein the action of performing a semantic analysis comprises:

determining one or more implications of the one or more expressions;

identifying or determining one or more actions based at least in part upon the one or more implications;

performing at least one of the one or more actions; and generating the second code of the second portion of the program.

10. The computer implemented method of claim 1, wherein the first mode comprises an optimized, compiled mode of execution of the program, and the first code comprises an optimized, compiled executable for at least the first portion of the program.

11. The computer implemented method of claim 1, wherein the second code comprises an interpreted, compiled, or translated code for at least the second portion of the program and is different from the first code.

12. The computer implemented method of claim 1, wherein the trigger comprises a user's request to continue the execution of the program in the second mode, a system state of the execution of the program in the first mode, or an environment state of the execution of the program in the first mode.

13. The computer implemented method of claim 1, further comprising:

identifying an additional trigger to continue the execution of the program in a third mode;

switching to the third mode to continue the execution of the program in the third mode using a third code of a third portion of the program;

generating an additional preparation for the execution of the program in the third mode; and continuing the execution of the program in the third mode without restarting the execution of the program.

14. A system for using multiple modes in execution of a program, comprising:

at least one processor or at least one processor core of a computing system that executes a sequence of instructions to:

initiate, continue, or resume execution of the program in a first mode using a first code of a first portion of the program;

identify a single trigger to switch the execution of the program multiple times among multiple modes including the first mode and a second mode;

determining whether preparation that comprises a second code for the second mode exists, further comprising:

when the preparation for the second mode is determined not to exist, stopping the execution of the program in the first mode and generating the preparation, generating the preparation further comprising at least one of:

modifying a dispatch table at or before an entry point of a second portion of the program in the execution of the program in the first mode; or modifying an address at or before the entry point of the second portion of the program in the execution of the program in the first mode;

switch to the second mode by using the dispatch table in response to the single trigger to improve performance of the execution of the program without re-executing the first portion of the program and without compiling a source code or an intermediate code of the program for switching to the second mode, wherein the dispatch table includes an entry corresponding to the second mode;

generate the second code of the second portion of the program for the execution of the program in the second mode, wherein the first portion is different from the second portion; and continue the execution of the program with the second code in the second mode.

15. The system of claim 14, the at least one processor or the at least one processor core is further to:

determine whether there exists an additional trigger to continue the execution in a specified mode.

16. The system of claim 15, wherein the at least one processor or the at least one processor core that is to generate the preparation for the execution of the program in the second mode is further to:

define means of acquiring knowledge about the execution of the program in the second mode;

perform lexical analysis on a representation of the program;

perform a syntactic analysis on the representation of the program or a modified representation of the program based at least in part upon a result of the act of performing the lexical analysis; and perform a semantic analysis based at least on a result of the act of performing the syntactic analysis.

17. An article of manufacture comprising a non-transitory computer readable storage medium having a sequence of instructions stored thereupon which, when executed by at least one processor or at least one processor core, causes the at least one processor or the at least one processor core to perform a method for using multiple modes in execution of a program, the method comprising:

using the at least one processor of a computing system to perform a process, the process comprising:

initiating, continuing, or resuming execution of the program in a first mode using a first code of a first portion of the program;

identifying a single trigger to switch the execution of the program multiple times among multiple modes including the first mode and a second mode;

determining whether preparation that comprises a second code for the second mode exists, further comprising:

when the preparation for the second mode is determined not to exist, stopping the execution of the program in the first mode and generating the preparation, generating the preparation further comprising at least one of:

modifying a dispatch table at or before an entry point of a second portion of the program in the execution of the program in the first mode; or modifying an address at or before the entry point of the second portion of the program in the execution of the program in the first mode;

switching to the second mode in response to the single trigger to improve performance of the execution of the program without re-executing the first portion of the program and without compiling a source code or an intermediate code of the program for switching to the second mode, wherein the switching is implemented by using the dispatch table with entries associated with the multiple modes and selecting an entry of the dispatch table corresponding to the second mode;

generating the second code of the second portion of the program for the execution of the program in the second mode, wherein the first portion is different from the second portion; and continuing the execution of the program with the second code in the second mode.

18. The article of manufacture of claim 17, the process further comprising:

determining whether there exists an additional trigger to continue the execution in a specified mode.

\* \* \* \* \*